United States Patent [19]

Strauss et al.

[11] 4,138,499

[45] Feb. 6, 1979

[54] PREPARATION OF BEER WITH REDUCED CALORIES

[75] Inventors: Karl M. Strauss, Milwaukee; Harold H. Geller, Glendale; Bernd J. Wagner, Whitefish Bay, all of Wis.

[73] Assignee: Pabst Brewing Company, Milwaukee, Wis.

[21] Appl. No.: 816,670

[22] Filed: Jul. 14, 1977

Related U.S. Application Data

[63] Continuation-in-part of Ser. No. 740,437, Nov. 10, 1976, abandoned.

[51] Int. Cl.$^2$ ............................................. C12C 11/04
[52] U.S. Cl. .......................................... 426/16; 426/29
[58] Field of Search ...................... 416/11, 13, 16, 28, 416/29

[56] References Cited

U.S. PATENT DOCUMENTS 3,717,471  2/1973  Stat et al. ........................... 426/16 X
3,852,495  12/1974  Schimpf et al. .................... 426/11 X

FOREIGN PATENT DOCUMENTS 9783 of  1897  United Kingdom ...................... 426/16
387639  2/1933  United Kingdom ...................... 426/16

OTHER PUBLICATIONS

Hind, H. L., Brewing Science and Practice, vol. II, Chapman & Hall, Ltd., London 1950 (pp. 866-867).

*Primary Examiner*—David M. Naff
*Attorney, Agent, or Firm*—Richard L. Johnston

[57] ABSTRACT

A low dextrin and low carbohydrate beer having reduced calories is produced by fermenting wort with yeast in the absence of readily fermentable carbohydrates so that the yeast act on fermentable ingredients in the wort other than readily fermentable carbohydrates. After fermenting a major portion of fermentable ingredients, there is added to the resulting alcoholic wort a quantity of one or more readily fermentable sugars and fermentation is continued until the real degree of fermentation is at least 80%. By this process a low calorie beer can be prepared without the use of a carbohydrate splitting enzyme such as amyloglucosidase.

9 Claims, No Drawings

PREPARATION OF BEER WITH REDUCED CALORIES

RELATED APPLICATION

This application is a continuation-in-part of U.S. application Ser. No. 740,437 filed Nov. 10, 1976, now abandoned.

BACKGROUND

In recent years considerable attention has been given to the preparation of alcoholic beer having a reduced calorie content as compared to regular commercial beers. One method of preparing such a beer is described in U.S. Pat. No. 3,379,534 wherein a carbohydrate splitting enzyme, amyloglucosidase, is used in various stages of the process. The process is said to result in a beer having substantially no dextrins or less than a major part of dextrins normally present in commercial beer. It is also alleged that such a beer containing little or no dextrins has a significantly lower caloric content than beers heretofore made with the same alcoholic content. A significant disadvantage of this beer, however, resides in the fact that the added enzymes are not inactivated during the usual pasteurization of the beer and continue to react in the bottle. Enzyme activity may result in a continual, undesirable flavor change in the product after it is packaged and in the hands of the consumer.

Another marked disadvantage of beer produced with amyloglucosidase enzymes is the processing problem encountered when such a beer is inadvertently mixed with normally produced beer. When this occurs, the normally produced beer changes rapidly in flavor and continues to do so, even after packaging and pasteurization.

OBJECTS

One of the objects of the present invention is to produce a beer which contains greatly reduced amounts of dextrin and carbohydrate compared to regular commercial beers.

Another object of the invention is to produce a beer containing approximately one-third to one-half fewer calories than common commercial beers.

Still a further object of the invention is to produce a beer which has a significant lower content of dextrins and other calorie-providing substances in its real extract in proportion to its alcohol content.

An additional object of the invention is to provide a new and improved process for producing a beer containing a low level of carbohydrate materials and a lower calorie content than beers heretofore made with the same alcohol content.

Another object of the invention is to provide a new and improved process for producing a low calorie alcoholic beer using only natural substances as brewing ingredients and which does not require the unnatural addition of enzymes such as amyloglucosidase to produce the desired results.

BRIEF SUMMARY OF THE INVENTION

A low dextrin and low carbohydrate beer with reduced calories is prepared by fermenting an all grain malt wort or a wort obtained from a mixture of grain malt and a minor proportion by weight non-malt grain with brewer's yeast without any other substances fermentable by brewer's yeast such as fermentable sugars, continuing the fermentation for a period of time so that the brewer's yeast acts on the ingredients of said wort rather than on readily fermentable sugars which would otherwise be selectively fermented rather than the ingredients of said wort, and, after a major proportion of the fermentable ingredients in said wort have been fermented, adding to the resultant fermenting wort a quantity of one or more sugars readily fermentable by brewer's yeast, and completing the fermentation until the real degree of fermentation is at least 80%. By this process a reduced calorie beer, e.g., a beer with approximately ninety-six calories per twelve fluid ounces an an alcohol content of approximately 3.2% by weight or a beer with approximately seventy calories per twelve fluid ounces and an alcohol content of approximately 2.3% by weight can be prepared and no carbohydrate splitting enzyme such as amyloglucosidase is required.

DETAILED DESCRIPTION OF THE INVENTION

A beer with ninety-six calories or less per twelve fluid ounces can only be produced if the original gravity of this beer does not exceed about 7.6–7.7° P. (P=Plato). With normal brewing technology and the use of common brewer's yeast, the highest possible real degree of fermentation is about 74%. This degree of fermentation, however, is not sufficient to produce 3.2% alcohol by weight from a wort with an original gravity of 7.6 to 7.7° P. The process provided in accordance with the present invention results in a real degree of fermentation of 80% or more without the addition of amyloglucosidase-containing preparations. Moreover, as previously indicated, by carrying out the fermentation initially for a predetermined period of time using an all-grain malt wort such as a wort from malted barley or a wort obtained from a mixture of grain malt and not more than 30% by weight non-malt grain, the brewer's yeast acts on the all-grain malt wort or a wort from a mixture of grain malt and non-malt grain, thereby making it possible to produce a significant alcoholic content from these ingredients. After this, readily fermentable sugars such as dextrose (also known as glucose), fructose, sucrose, or mixtures of these sugars, are added and the fermentation continued to completion. Basically the production of low carbohydrate and lower calorie beer in accordance with the invention is carried out by subjecting the more complex carbohydrates of the wort to the yeast in the absence of the more readily fermentable lower sugars. This treatment causes the yeast to ferment out some of the less easily fermentable carbohydrates which it would not otherwise do if the lower readily fermentable sugars were present.

The invention is illustrated but not limited by the following examples in which proportions are by weight unless otherwise indicated.

EXAMPLE 1

A mixture of barley malt and water is mashed in at 113° F. and the temperature raised to 145° F. and held at that point for 45 minutes. The mash temperature is then raised to 168° F. in 45 minutes and held there for 5 minutes. The mash in then filtered and the residual extract is washed out of the grains with water at 168° F. The filtrate and the washing solution is collected in the brew kettle and boiled in the usual manner until the wort is 7.6–7.7° P. Hops are added during the boiling. The wort is cooled to 52° F., saturated with air and mixed with one and one-half pounds of yeast per barrel of wort. The wort is allowed to ferment for three days during which the temperature rises to 57° F. and is kept at that level.

On the fourth day, a dextrose solution of 7.6–7.7° P. is prepared using dry dextrose, boiled and cooled to 57° F., aerated and added to the fermenting, all-malt wort. Equal volumes of fermenting wort and dextrose solution are used so that the fermenting materials consist of 50–50 mixture by volume of malt extract and dextrose solution. The combined solutions are kept in the fermenter for another four to five days until the fermentation is complete. The fermented beer now contains about 3.2% alcohol by weight and is processed in the usual manner.

EXAMPLE II

The procedure is the same as in Example I except that the barley malt and the dextrose are mixed with water in such a ratio that the resulting concentration is 5.5–5.6° P. The fermented beer now contains approximately seventy calories per twelve fluid ounces and approximately 2.3% alcohol by weight.

EXAMPLE III

A mixture of 16,700 lbs. of barley malt in 170 barrels (31 gallons per barrel) of water is mashed in at 147° F. and held for 45 minutes. The mash temperature is then raised to 168° F. in 45 minutes and held at that temperature for 5 minutes. The mash is then filtered in a mash filter and the residual extract is washed out of the grain with 260 barrels of water at 168° F. The filtrate and the washing solution are combined and boiled for an appropriate period in the brew kettle until the wort is 12.1–12.3° P. Hops (208 lbs.) are added during the boil of the wort. The wort is then cooled to 52° F., saturated with air and mixed with yeast at a rate of 2.5 lbs. of yeast per barrel of wort. The original gravity of the wort is 12° P. The wort is allowed to ferment for four days; the temperature rises to 57° F. and is kept at that level.

On the fifth day of the wort fermentation, a solution containing 16,700 lbs. of dry dextrose in 405 barrels of water (approximately 16% by weight dextrose) is prepared in a brew kettle. This solution is sterilized by boiling for 30 minutes, is then cooled to 57° F., saturated with air and pumped into the fermenting, all-malt wort at a ratio of 465 barrels of said dextrose solution to 350 barrels of said malt wort. The combined solution from the malt brew and the dextrose solution is kept in the fermenter for another five to seven days until the apparent extract Plato reading drops below 0.2. The fermented beer is then cooled to about 32° F. and is transferred into the storage cellar where the beer is processed in the usual manner. Before packaging, the beer is adjusted with water to an original gravity of 7.6 to 7.7° P. The finished product contains approximately 3.2% alcohol by weight.

EXAMPLE IV

The procedure is the same as in Example III except that the beer is adjusted before packaging to an original gravity of 5.5–5.6° P. The finished product now contains approximately seventy calories per twelve fluid ounces and an alcohol content of approximately 2.3% by weight.

EXAMPLE V

The procedure is the same as in Examples I, II, III, or IV except that as much as 30% of the malt used is substituted by an adjunct such as corn grits, rice, unmalted barley, or mixtures of one or more of said ingredients.

EXAMPLE VI

The procedure is the same as in Examples I, II, III, IV and V except that liquid dextrose is used instead of dry dextrose. The liquid dextrose is diluted to the appropriate degree with water and handled as described in the previous examples.

EXAMPLE VII

The procedure is the same as in Examples I, II, III, IV and V except that the dextrose solution is added any time after the second day of the all-grain wort fermentation.

EXAMPLE VIII

The procedure is the same as in Examples I, II, III, IV and V except that the ratio of extract originating from the malt grain brews and the dextrose solution varies from 30% malt-grain extract and 70% dextrose solution to 60% malt-grain extract and 40% dextrose solution.

EXAMPLE IX

The procedure is the same as in Examples I through VIII except that the dextrose is substituted with another sugar that is readily fermentable by brewer's yeast, for example, fructose, sucrose or mixtures of these sugars.

It will be apparent from the foregoing examples that the initial wort is obtained from a mash made from a malted grain, preferably barley malt or a mixture of a malted grain and a minor proportion of other grains commonly used in the brewing industry such as, for example, corn, rice, unmalted barley, or mixtures of one or more of said ingredients. Hops are added to the extract or wort in selected amounts to alter the taste characteristics.

The wort is fermented without adding any readily fermentable substances such as dextrose, fructose, sucrose or other simple sugars, until a major proportion of the fermentable ingredients have been fermented, i.e., usually for at least twenty four hours, preferably three to four days or, in some cases, up to seven days or longer, then the readily fermentible simple sugars are added and the fermentation is completed. In this way, it is possible to prepare a beer with a real degree of fermentation of at least 80% using normal brewer's yeast without the addition of enzymes such as amyloglucosidase. Thus, the process involves only the use of natural ingredients.

By practice of the invention a flavorful reduced calorie beer can be obtained, e.g., a beer with approximately ninety-six calories for twelve fluid ounces and an alcoholic content of approximately 3.2% by weight or a beer with approximately seventy calories per twelve fluid ounces and an alcohol content of approximately 2.3% by weight. This beer can be processed in the same manner as regular beer including one or more steps such as carbonation, addition of chillproofing materials and pasteurization. It can also be mixed with regular beer without causing undesirable flavor changes such as those that occur when a beer produced with amyloglucosidase enzymes is mixed with normally produced beer.

As shown by the examples, the relative proportions of malt-grain and readily fermentable sugars are subject to variation. In general, it is preferable to mix approximately equal volumes of the malt grain wort and a fermentable sugar aqueous solution of substantially equal Plato values but this can vary within ranges of, for example, 30% malt grain extract and 70% sugar solution to 60% malt grain extract and 40% sugar solution.

It will be understood that dextrose (glucose) fructose and/or sucrose are preferably employed because they are readily fermentable by common brewer's yeast and also are commercially available. Other such readily fermentable sugars might be used but are not practical from an economic standpoint. Various other modifications can be made without departing from the invention.

The invention is hereby claimed as follows:

1. A process of preparing a low dextrin and low carbohydrate beer with reduced calories which consists essentially of fermenting an all-grain malt wort or a wort obtained from a mixture of grain malt and not more than about 30% by weight non-malt grain with brewer's yeast, continuing the fermentation for a period of time until a major proportion of the fermentable ingredients in said wort have been fermented, then adding to the resultant alcoholic wort a quantity of sugar solution containing one or more sugars readily fermentable by brewer's yeast in an amount so that the sugar solution has a Plato value substantially equal to the Plato value of said wort prior to fermentation, the volume ratio of wort derived from the malt grain or mixtures of malt grain and non-malt grain and the sugar solution being within the range of from 30% malt grain wort and 70% sugar solution to 60% malt grain wort and 40% sugar solution and completing the fermentation until a real degree of fermentation of at least 80% using common brewer's yeast is obtained thus resulting in a product which contains not more than about 96 calories per twelve fluid ounces and not more than about 3.2% alcohol by weight.

2. A process as claimed in claim 1 wherein the fermenting wort in the first stage of said process is obtained entirely from a grain malt.

3. A process as claimed in claim 1 wherein the fermenting wort in the first stage of said process is obtained entirely from barley malt.

4. A process as claimed in claim 1 wherein the fermentable sugar is powdered dextrose or an aqueous solution of dextrose.

5. A process as claimed in claim 1 in which the fermenting wort in the first stage of fermentation is obtained from a mixture of grain malt and a minor proportion of a non-malted grain.

6. A process as claimed in claim 5 in which the non-malted grain is selected from the group consisting of corn grits, rice and unmalted barley.

7. A process as claimed in claim 1 in which said readily fermentable sugars are dextrose, fructose and sucrose.

8. A process as claimed in claim 1 in which the product contains about 96 calories per twelve fluid ounces and about 3.2% alcohol by weight.

9. A process as claimed in claim 1 in which the product contains about 70 calories per twelve fluid ounces and about 2.3% alcohol by weight.

* * * * *